United States Patent
Son et al.

(10) Patent No.: US 11,339,231 B2
(45) Date of Patent: May 24, 2022

(54) OLEFIN-BASED RESIN COMPOSITION, MANUFACTURING METHOD THEREFOR, AND MOLDED ARTICLE THEREOF

(71) Applicant: ADEKA CORPORATION, Tokyo (JP)

(72) Inventors: Changsu Son, Saitama (JP); Tomomasa Tezuka, Saitama (JP); Kazukiyo Nomura, Saitama (JP)

(73) Assignee: ADEKA CORPORATION, Tokyo (JP)

( * ) Notice: Subject to any disclaimer, the term of this patent is extended or adjusted under 35 U.S.C. 154(b) by 151 days.

(21) Appl. No.: 16/763,370

(22) PCT Filed: Nov. 7, 2018

(86) PCT No.: PCT/JP2018/041405
§ 371 (c)(1),
(2) Date: May 12, 2020

(87) PCT Pub. No.: WO2019/093393
PCT Pub. Date: May 16, 2019

(65) Prior Publication Data
US 2020/0317830 A1    Oct. 8, 2020

(30) Foreign Application Priority Data

Nov. 13, 2017 (JP) .............................. JP2017-218256

(51) Int. Cl.
| | |
|---|---|
| *C08L 23/12* | (2006.01) |
| *C08F 10/06* | (2006.01) |
| *C08K 5/098* | (2006.01) |
| *C08K 5/527* | (2006.01) |
| *C08L 23/10* | (2006.01) |
| *C08K 5/523* | (2006.01) |

(52) U.S. Cl.
CPC ............. *C08F 10/06* (2013.01); *C08K 5/098* (2013.01); *C08K 5/527* (2013.01); *C08L 23/10* (2013.01); *C08K 5/523* (2013.01); *C08L 23/12* (2013.01); *C08L 2205/025* (2013.01); *C08L 2207/04* (2013.01); *C08L 2314/02* (2013.01)

(58) Field of Classification Search
None
See application file for complete search history.

(56) References Cited

FOREIGN PATENT DOCUMENTS

| JP | 3044259 B2 | 5/2000 |
|---|---|---|
| JP | 2003-313444 A | 11/2003 |
| JP | 2011-219519 A | 11/2011 |
| JP | 2011219519 A | * 11/2011 |
| JP | 2012-152933 A | 8/2012 |
| JP | 2013-256628 A | 12/2013 |
| JP | 2017-125111 A | 7/2017 |
| JP | 2017-190440 A | 10/2017 |
| JP | 2017190440 A | * 10/2017 |

OTHER PUBLICATIONS

International Search Report issued in PCT/JP2018/041405 (PCT/ISA/210), dated Feb. 5, 2019.
Written Opinion of the International Searching Authority issued in PCT/JP2018/041405 (PCT/ISA/237), dated Feb. 5, 2019.

* cited by examiner

*Primary Examiner* — Richard A Huhn
(74) *Attorney, Agent, or Firm* — Birch, Stewart, Kolasch & Birch, LLP

(57) ABSTRACT

Provided are: an olefin-based resin composition that can yield a molded article having excellent transparency in which coloration is inhibited; a method for producing the olefin-based resin composition; and a molded article of the olefin-based resin composition. The olefin-based resin composition contains, with respect to 100 parts by mass of an olefin polymer: 0.001 to 10 parts by mass of one or more compounds (A) represented by Formula (1) wherein $R^1$ to $R^4$ each independently represent a hydrogen atom or an alkyl group having 1 to 9 carbon atoms; $R^5$ represents a hydrogen atom or methyl; m represents 1 or 2; and $M^1$ represents, for example, a hydrogen atom; and 0.001 to 10 parts by mass of a fatty acid metal salt (B) represented by Formula (2) wherein $R^6$ represents a group having 10 to 30 carbon atoms and introduced from an aliphatic organic acid; n represents 1 or 2; and $M^2$ represents an alkali metal atom or a multivalent metal inorganic group. In the olefin-based resin composition, an aluminum content in the olefin polymer is 0.01 mol or less per 1 kg of the olefin polymer.

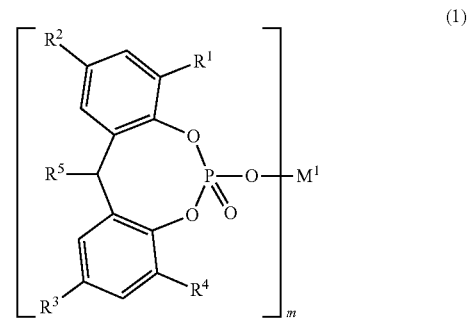

(1)

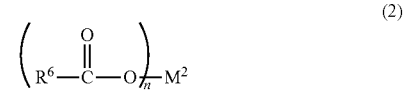

(2)

4 Claims, No Drawings

OLEFIN-BASED RESIN COMPOSITION, MANUFACTURING METHOD THEREFOR, AND MOLDED ARTICLE THEREOF

TECHNICAL FIELD

The present invention relates to an olefin-based resin composition, a method for producing the olefin-based resin composition, and a molded article of the olefin-based resin composition. More particularly, the present invention relates to: an olefin-based resin composition that can yield a molded article having excellent transparency in which coloration is inhibited; a method for producing the olefin-based resin composition; and a molded article of the olefin-based resin composition.

BACKGROUND ART

Olefin resins, such as polyethylene, polypropylene and polybutene-1, advantageously have excellent moldability, heat resistance, mechanical characteristics, low specific gravity and the like; therefore, they are widely utilized in films, sheets, and various molded articles (e.g., structural components). However, olefin resins have drawbacks in that they have a long molding cycle due to low crystallization rate after heat-molding, that they generate large crystals depending on the progress of crystallization after heat-molding, and that their molded articles are thus insufficient in terms of transparency and strength.

These drawbacks are all attributed to the crystallinity of olefin resins, and it is known that such drawbacks are solved by increasing the crystallization temperature of each olefin resin and thereby allowing the olefin resin to rapidly generate fine crystals.

For this purpose, it is known to add a nucleating agent and, conventionally, for example, carboxylates, such as sodium benzoate, 4-tert-butylbenzoate aluminum salt, sodium adipate, and 2 sodium-bicyclo[2.2.1]heptane-2,3-dicarboxylate; metal phosphates, such as sodium bis(4-tert-butylphenyl)phosphate, sodium 2,2'-methylene-bis(4,6-di-tert-butylphenyl)phosphate, and lithium 2,2'-methylene-bis(4,6-di-tert-butylphenyl)phosphate; and compounds having an acetal skeleton, such as dibenzylidene sorbitol, bis(methylbenzylidene)sorbitol and bis(dimethylbenzylidene)sorbitol, have been used.

A method for adding any of these nucleating agents to an olefin resin is widely known. An olefin resin and additives including a nucleating agent are mixed using a Henschel mixer, a mill roll, a V-blender, a ribbon blender, a kneader blender, a Banbury mixer, a super mixer or the like, and the resulting mixture is loaded to an extruder and granulated.

In addition, Patent Document 1 proposes a method of adding aluminum hydroxy-bis(p-tert-butylbenzoate) or sodium benzoate as a nucleating agent at the time of polymerizing propylene. Moreover, Patent Document 2 proposes a method of producing an olefin-based resin composition, the method including: a first step of polymerizing an olefin monomer with an addition of hydroxy[2,2'-methylene-bis(4,6-di-tert-butylphenyl)phosphate]dissolved using an organoaluminum compound; and a second step of adding a metal aliphatic carboxylate or an alkali metal-containing hydrotalcite to a polymer obtained in the first step and melt-kneading the resultant.

RELATED ART DOCUMENTS

Patent Documents

[Patent Document 1] JP3044259B2
[Patent Document 2] JP2013-256628A

SUMMARY OF THE INVENTION

Problems to be Solved by the Invention

However, in such a method where a nucleating agent is incorporated at the time of granulating a polymer, variations may occur in the product physical properties due to defective dispersion of the nucleating agent. In addition, since the majority of nucleating agents is in a powder form, the working environment may be adversely affected or contaminated due to dust generation during operation.

The method described in Patent Document 1, which aims at uniformly dispersing a nucleating agent and thereby improving the resulting polymer, is a production method where a single-step polymerization of propylene is followed by a two-step polymerization with an addition of a nucleating agent. However, a desired effect cannot be obtained in a single-step polymerization method where a nucleating agent is brought into contact with a polymerization catalyst. In addition, in the method described in Patent Document 2, a nucleating agent is masked with an organoaluminum compound, and this enables to avoid polymerization inhibition caused by a contact between the nucleating agent and a polymerization catalyst; however, a large amount of catalyst residue remains in the resulting olefin polymer, and there is still room for improvement in terms of the transparency of its molded article.

In view of the above, an object of the present invention is to provide: an olefin-based resin composition that can yield a molded article having excellent transparency in which coloration is inhibited; a method for producing the olefin-based resin composition; and a molded article of the olefin-based resin composition.

Means for Solving the Problems

The present inventors intensively studied to solve the above-described problems and consequently discovered that the problems can be solved by adjusting the amount of an organoaluminum compound remaining in a polymer obtained after polymerization to be in a specific range, thereby completing the present invention.

The olefin-based resin composition of the present invention contains, with respect to 100 parts by mass of an olefin polymer:

0.001 to 10 parts by mass of one or more compounds (A) represented by the following Formula (1):

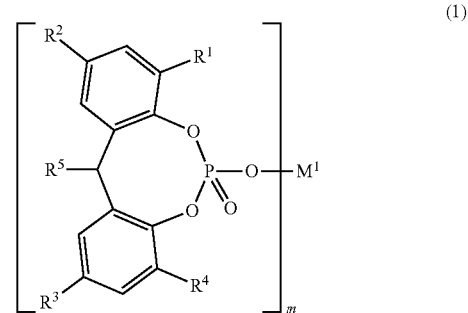

wherein R to $R^4$ each independently represent a hydrogen atom or an alkyl group having 1 to 9 carbon atoms; $R^5$ represents a hydrogen atom or methyl; m represents 1 or 2; and M represents a hydrogen atom, an alkali metal atom, an alkaline earth metal atom, a transition metal atom, a base metal atom, a multivalent metal inorganic group, an ammonium group, a sulfonium group, or a lanthanoid; and 0.001 to 10 parts by mass of a fatty acid metal salt (B) represented by the following Formula (2):

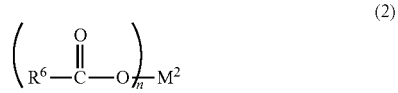
(2)

wherein $R^6$ represents a group having 10 to 30 carbon atoms and introduced from an aliphatic organic acid; n represents 1 or 2; when n is 1, $M^2$ represents an alkali metal atom; and when n is 2, $M^2$ represents a divalent multivalent metal inorganic group, the olefin-based resin composition being characterized in that an aluminum content in the olefin polymer is 0.01 mol or less per 1 kg of the olefin polymer.

In the olefin-based resin composition of the present invention, the aluminum content in the olefin polymer is preferably 0.001 to 0.01 mol per 1 kg of the olefin polymer. Further, in the olefin-based resin composition of the present invention, $M^2$ of the fatty acid metal salt (B) represented by Formula (2) is preferably an alkali metal atom.

The method for producing an olefin-based resin composition according to the present invention includes:

a first step of adding one or more compounds (A) represented by Formula (1) and an organoaluminum compound (C), which are blended at a molar ratio [(aluminum content of organoaluminum compound (C))/compound (A)] in a range of 0.40 to 1.30, before or during polymerization of an olefin monomer:

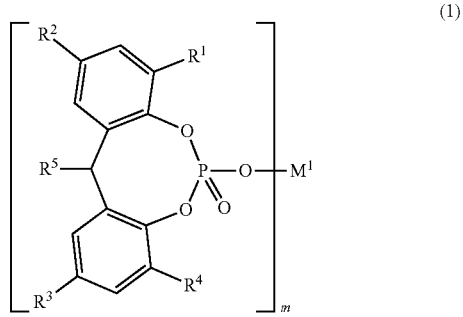
(1)

wherein R to $R^4$ each independently represent a hydrogen atom or an alkyl group having 1 to 9 carbon atoms; $R^5$ represents a hydrogen atom or methyl; m represents 1 or 2; and $M^1$ represents a hydrogen atom, an alkali metal atom, an alkaline earth metal atom, a transition metal atom, a base metal atom, a multivalent metal inorganic group, an ammonium group, a sulfonium group, or a lanthanoid; and a second step of adding 0.001 to 10 parts by mass of a fatty acid metal salt (B) represented by Formula (2) with respect to 100 parts by mass of a polymer obtained by the polymerization of the olefin monomer, and melt-kneading the resultant using an extruder:

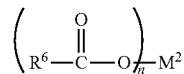
(2)

wherein $R^6$ represents a group having 10 to 30 carbon atoms and introduced from an aliphatic organic acid; and $M^2$ represents an alkali metal atom or a multivalent metal inorganic group, the method being characterized in that an aluminum content in the resulting olefin polymer is 0.01 mol or less per 1 kg of the olefin polymer.

In the method for producing an olefin-based resin composition according to the present invention, the polymerization of the olefin monomer is performed by bulk polymerization. Further, in the method for producing an olefin-based resin composition according to the present invention, the organoaluminum compound (C) is preferably a trialkyl aluminum.

The molded article of the present invention is characterized by obtained by using the olefin-based resin composition of the present invention.

Effects of the Invention

According to the present invention, an olefin-based resin composition that can yield a molded article having excellent transparency in which coloration is inhibited, a method for producing the olefin-based resin composition; and a molded article of the olefin-based resin composition can be provided.

MODE FOR CARRYING OUT THE INVENTION

An olefin-based resin composition of the present invention, a method for producing the olefin-based resin composition of the present invention, and a molded article of the olefin-based resin composition of the present invention will now be described in detail. The olefin-based resin composition of the present invention contains, with respect to 100 parts by mass of an olefin polymer: 0.01 to 10 parts by mass of one or more compounds (A) represented by Formula (1) below (hereinafter, also referred to as "component (A)"); and 0.001 to 10 parts by mass of a fatty acid metal salt (B) represented by Formula (2) below (hereinafter, also referred to as "component (B)"):

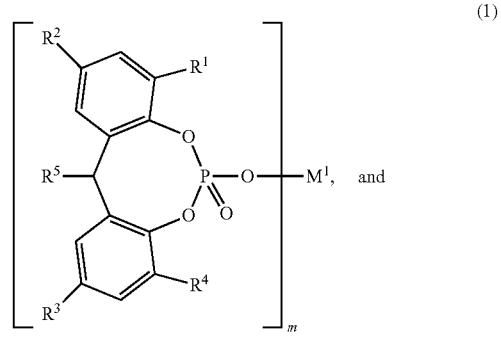
(1), and

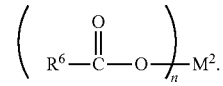
(2).

Further, an aluminum content in the olefin polymer is 0.01 mol or less per 1 kg of the olefin polymer.

First, the olefin polymer used in the olefin-based resin composition of the present invention will be described. In the olefin-based resin composition of the present invention, the olefin polymer is a polymer obtained by homopolymerization of an olefin monomer, or copolymerization including an olefin monomer.

Examples of the olefin monomer used in the olefin-based resin composition of the present invention include ethylene, propylene, 1-butene, 1-hexene, 3-methyl-1-butene, 3-methyl-1-pentene, 4-methyl-1-pentene, vinylcycloalkane, styrene, and derivatives of these monomers.

Specific examples of the olefin polymer include propylene homopolymers; polypropylenes, such as copolymers of propylene and an α-olefin other than propylene (e.g., ethylene-propylene copolymers and ethylene-propylene-butene copolymers); polyethylenes, such as high-density polyethylenes; and cycloolefins.

Next, the component (A) will be described. In the component (A), $R^1$ to $R^4$ each independently represent a hydrogen atom or an alkyl group having 1 to 9 carbon atoms; $R^5$ represents a hydrogen atom or methyl; m represents 1 or 2; and $M^1$ represents a hydrogen atom, an alkali metal atom, an alkaline earth metal atom, a transition metal atom, a base metal atom, a multivalent metal inorganic group, an ammonium group, a sulfonium group, or a lanthanoid.

Examples of the alkyl group having 1 to 9 carbon atoms that is represented by $R^1$, $R^2$, $R^3$ and $R^4$ in Formula (1) include methyl, ethyl, propyl, isopropyl, butyl, sec-butyl, tert-butyl, isobutyl, amyl, isoamyl, tert-amyl, hexyl, cyclohexyl, heptyl, isoheptyl and tert-heptyl, among which tert-butyl is more preferred.

Examples of the alkali metal atom represented by $M^1$ in Formula (1) include lithium, sodium, and potassium. In the olefin-based resin composition of the present invention, lithium and sodium are more preferred.

Examples of the alkaline earth metal atom represented by $M^1$ in Formula (1) include calcium, strontium, barium, and radium. In the olefin-based resin composition of the present invention, calcium and barium can be preferably used.

Examples of the transition metal atom represented by $M^1$ in Formula (1) include scandium, titanium, vanadium, chromium, manganese, iron, cobalt, nickel, copper, yttrium, zirconium, niobium, molybdenum, technetium, ruthenium, rhodium, palladium, silver, hafnium, tantalum, tungsten, rhenium, osmium, iridium, platinum, and gold. In the olefin-based resin composition of the present invention, copper and zirconium are preferred since these metal atoms make the effects of the present invention prominent.

Examples of the base metal atom represented by $M^1$ in Formula (1) include iron, copper, aluminum, lead, zinc, tin, tungsten, indium, molybdenum, chromium, germanium, tantalum, magnesium, cobalt, cadmium, titanium, zirconium, vanadium, gallium, antimony, manganese, nickel, beryllium, hafnium, niobium, bismuth, rhenium, and thallium. In the olefin-based resin composition of the present invention, copper, aluminum, zinc and magnesium are preferably used since they can be produced inexpensively.

In the multivalent metal inorganic group represented by $M^1$ in Formula (1), the "metal" refers to a divalent to tetravalent metal, and the "inorganic group" refers to an oxide, a hydroxy group, or a carbonate. Specific examples of the multivalent metal include calcium, magnesium, manganese, copper, zinc, aluminum, chromium, gallium, silicon, and zirconium. In the olefin-based resin composition of the present invention, aluminum or zirconium is preferably used.

Examples of the ammonium group represented by $M^1$ in Formula (1) include ammonium; trialkyl ammoniums, such as trimethyl ammonium, triethyl ammonium, tripropyl ammonium, and tributyl ammonium; N,N-dialkyl aniliniums, such as N,N-dimethyl anilinium, N,N-diethyl anilinium, and N,N-2,4,6-pentamethyl anilinium; and dialkyl ammoniums, such as di(isopropyl)ammonium and dicyclohexyl ammonium.

Examples of the sulfonium group represented by $M^1$ in Formula (1) include triphenyl sulfonium, (4-tert-butylphenyl)diphenyl sulfonium, bis(4-tert-butylphenyl)phenyl sulfonium, tris(4-tert-butylphenyl)sulfonium, (3-tert-butylphenyl)diphenyl sulfonium, bis(3-tert-butylphenyl)phenyl sulfonium, tris(3-tert-butylphenyl)sulfonium, (3,4-di-tert-butylphenyl)diphenyl sulfonium, bis(3,4-di-tert-butylphenyl)phenyl sulfonium, tris(3,4-di-tert-butylphenyl)sulfonium, (4-tert-butoxyphenyl)diphenyl sulfonium, bis(4-tert-butoxyphenyl)phenyl sulfonium, tris(4-tert-butoxyphenyl)sulfonium, (3-tert-butoxyphenyl)diphenyl sulfonium, bis(3-tert-butoxyphenyl)phenyl sulfonium, tris (3-tert-butoxyphenyl)sulfonium, (3,4-di-tert-butoxyphenyl)diphenyl sulfonium, bis(3,4-di-tert-butoxyphenyl)phenyl sulfonium, tris(3,4-di-tert-butoxyphenyl)sulfonium, diphenyl(4-thiophenoxyphenyl)sulfonium, (4-tert-butoxycarbonylmethyloxyphenyl)diphenyl sulfonium, tris(4-tert-butoxycarbonylmethyloxyphenyl)diphenyl sulfonium, (4-tert-butoxyphenyl)bis(4-dimethylaminophenyl)sulfonium, tris (4-dimethylaminophenyl)sulfonium, 2-naphthyldiphenyl sulfonium, dimethyl(2-naphthyl)sulfonium, (4-hydroxyphenyl)dimethyl sulfonium, (4-methoxyphenyl)dimethyl sulfonium, trimethyl sulfonium, (2-oxocyclohexyl)cyclohexylmethyl sulfonium, trinaphthyl sulfonium, tribenzyl sulfonium, diphenylmethyl sulfonium, dimethylphenyl sulfonium, 2-oxo-2-phenylethylthiacyclopentanium, diphenyl-2-thienyl sulfonium, 4-n-butoxynaphthyl-1-thiacyclopentanium, 2-n-butoxynaphthyl-1-thiacyclopentanium, 4-methoxynaphthyl-1-thiacyclopentanium, and 2-methoxynaphthyl-1-thiacyclopentanium. More preferred examples of the sulfonium group include triphenyl sulfonium, (4-tert-butylphenyl)diphenyl sulfonium, (4-tert-butoxyphenyl)diphenyl sulfonium, tris(4-tert-butylphenyl)sulfonium, (4-tert-butoxycarbonylmethyloxyphenyl)diphenyl sulfonium, (4-methylphenyl)diphenyl sulfonium, (4-ethylphenyl)diphenyl sulfonium, (4-cyclohexylphenyl)diphenyl sulfonium, (4-n-hexylphenyl)diphenyl sulfonium, (4-n-octyl)phenyldiphenyl sulfonium, (4-methoxyphenyl)diphenyl sulfonium, (4-ethoxyphenyl)diphenyl sulfonium, (4-tert-butoxyphenyl)diphenyl sulfonium, (4-cyclohexyloxyphenyl)diphenyl sulfonium, (4-trifluoromethylphenyl)diphenyl sulfonium, (4-trifluoromethyloxyphenyl)diphenyl sulfonium, and (4-tert-butoxycarbonylmethyloxyphenyl)diphenyl sulfonium.

The lanthanoid represented by $M^1$ in Formula (1) refers to an element selected from lanthanum, cerium, praseodymium, neodymium, promethium, samarium, europium, gadolinium, terbium, dysprosium, holmium, erbium, thulium, ytterbium, and lutetium.

In the olefin-based resin composition of the present invention, $M^1$ in Formula (1) is preferably a hydrogen atom since this makes the effects of the present invention prominent.

Specific examples of the component (A) used in the olefin-based resin composition of the present invention include the following compounds. It is noted here, however, that the olefin-based resin composition of the present invention is not restricted by any of the following compounds:

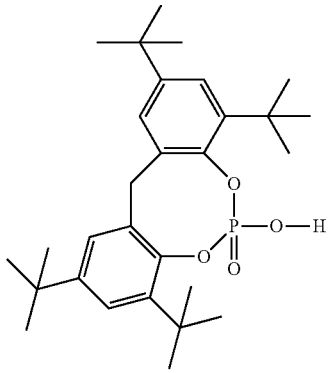

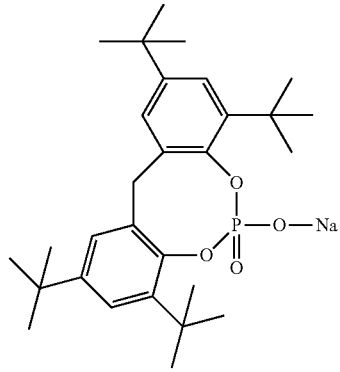

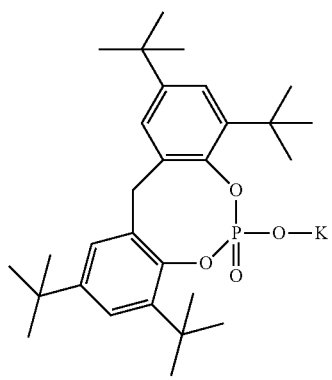

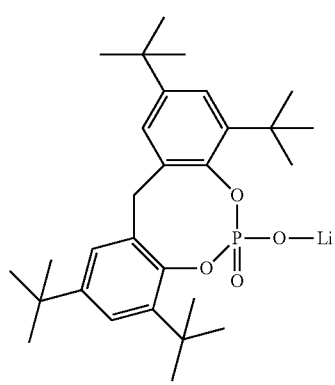

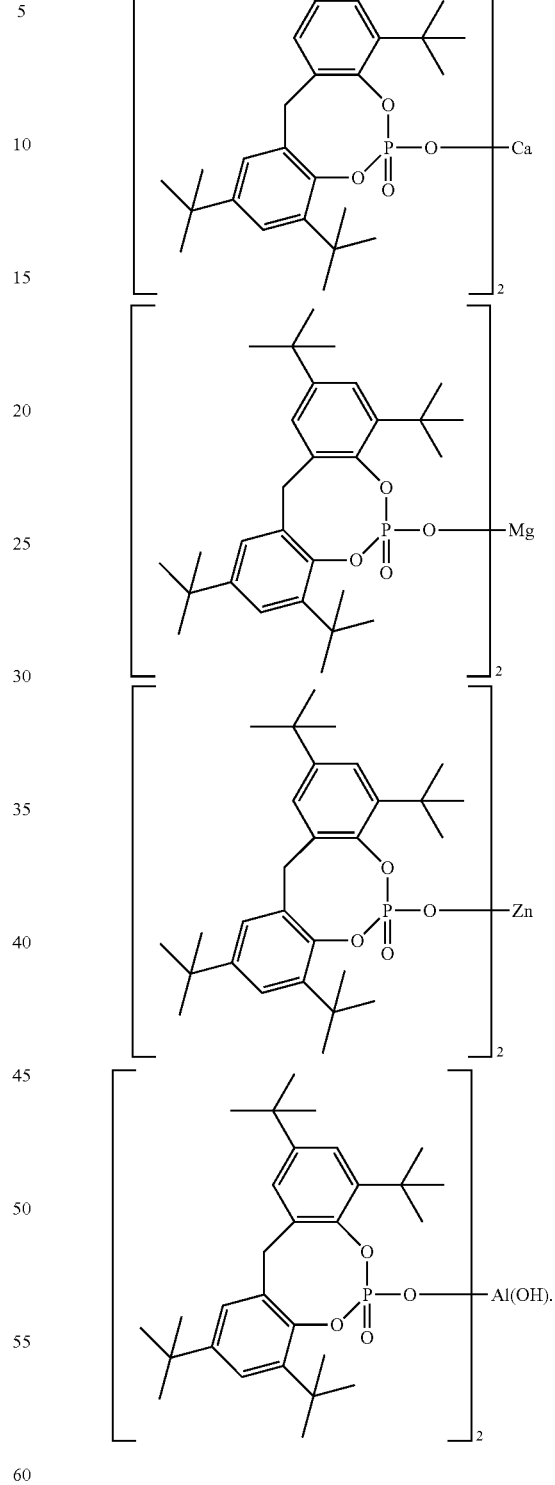

In the olefin-based resin composition of the present invention, it is preferred to use hydroxy[2,2'-methylene-bis(4,6-di-tert-butylphenyl)phosphate] as the component (A) since it can impart a polyolefin-based resin with most favorable transparency.

In the olefin-based resin composition of the present invention, the component (A) is not restricted in terms of the particle conditions such as particle size and particle size distribution; however, it is known that the smaller the particle size, the superior is the dispersion of the component (A) in a resin, and the volume-average particle size is preferably 100 μm or smaller, more preferably 30 μm or smaller, still more preferably 20 μm or smaller. In the olefin-based resin composition of the present invention, the "volume-average particle size" refers to a numerical value at which the volume-average is 50% as measured by a laser diffraction-scattering particle size distribution analyzer (manufactured by Nikkiso Co., Ltd., trade name: MICROTRAC MT3000II).

In the olefin-based resin composition of the present invention, the amount of the component (A) to be incorporated is 0.001 to 10 parts by mass, preferably in a range of 0.005 to 0.5 parts by mass, more preferably in a range of 0.01 to 0.3 parts by mass, with respect to 100 parts by mass of the olefin polymer. When the amount of the component (A) is less than 0.001 parts by mass, a nucleating effect may not be obtained, whereas when the amount of the component (A) is 10 parts by mass or greater, the component (A) may bleed out of a molded article obtained by molding the olefin polymer.

Next, the component (B) will be described. In the component (B), examples of the group introduced from an aliphatic organic acid having 10 to 30 carbon atoms, which group is represented by $R^6$ in the Formula (2), include alkyl groups and alkenyl groups that have 10 to 30 carbon atoms, and hydrocarbon groups such as alkyl groups in which two or more unsaturated bonds are introduced. The alkyl groups and the alkenyl groups may be branched, and some of the hydrogen atoms of the hydrocarbon groups may be substituted with hydroxy groups. Specific examples include saturated fatty acids, such as capric acid, 2-ethylhexanoic acid, undecylic acid, lauric acid, tridecylic acid, myristic acid, pentadecylic acid, palmitic acid, margaric acid, stearic acid, nonadecylic acid, arachidic acid, heneicosylic acid, behenic acid, tricosylic acid, lignoceric acid, cerotic acid, montanoic acid, and melissic acid; and linear unsaturated fatty acids, such as 4-decenoic acid, 4-dodecenoic acid, palmitoleic acid, α-linolenic acid, linoleic acid, γ-linolenic acid, stearidonic acid, petroselinic acid, oleic acid, elaidic acid, vaccenic acid, eicosapentaenoic acid, docosapentaenoic acid, and docosahexaenoic acid.

In the olefin-based resin composition of the present invention, a fatty acid having 10 to 21 carbon atoms is preferred, and a fatty acid having 12 to 18 carbon atoms is more preferred. Particularly, lauric acid, myristic acid, palmitic acid, stearic acid, 12-hydroxystearic acid, oleic acid, and linoleic acid are preferred since these fatty acids make the effects of the present invention prominent.

Examples of the alkali metal atom represented by $M^2$ in Formula (2) include sodium, lithium, and potassium; however, in the olefin-based resin composition of the present invention, the alkali metal atom is more preferably sodium or lithium since this makes the effects of the present invention prominent.

Examples of the multivalent metal inorganic group represented by $M^2$ in Formula (2) include the same ones as those exemplified above.

In the olefin-based resin composition of the present invention, the amount of the component (B) to be incorporated is 0.001 parts by mass to 10 parts by mass, preferably in a range of 0.005 parts by mass to 1 part by mass, more preferably in a range of 0.01 to 0.5 parts by mass, with respect to 100 parts by mass of the olefin polymer. When the amount of the component (B) is less than 0.001 parts by mass, the effects of the present invention may not be attained, whereas when the amount of the component (B) is 10 parts by mass or greater, a molded article obtained by molding the composition may be colored.

In the olefin-based resin composition of the present invention, the residual aluminum content is 0.01 mol or less with respect to 1 kg of the olefin polymer. When the residual aluminum content exceeds 0.01 mol, the olefin polymer is colored, and this may lead to deterioration of the external appearance of its molded article. Meanwhile, in order to control the residual aluminum content to be less than 0.001 mol, it is necessary to wash the resulting polymer repeatedly, and this leads to an increase in the production cost and is thus uneconomical. The residual aluminum content is preferably 0.001 to 0.009 mol with respect to 1 kg of the olefin polymer.

The method for producing an olefin-based resin composition according to the present invention will now be described. The method for producing an olefin-based resin composition according to the present invention is characterized by including: a first step of polymerizing an olefin monomer with an addition of one or more components (A) and an organoaluminum compound (C) (hereinafter, also referred to as "component (C)"), which are blended at a specific molar ratio, before or during the polymerization of the olefin monomer: and a second step of adding the component (B) to the thus obtained olefin polymer and melt-kneading the resultant using an extruder. It is noted here that the first step encompasses a case of polymerizing an olefin monomer with an addition of one or more component (A) and a mixed solvent of the component (C) and an organic solvent, which are blended at a specific molar ratio, before or during the polymerization of the olefin monomer.

In the method for producing an olefin-based resin composition according to the present invention, the component (C) is used for the purpose of masking the component (A) to eliminate adverse effects on a polymerization catalyst. As the component (C), it is preferred to use such an organoaluminum compound that allows the component (A) masked therewith to be renewable by a treatment with a hydrogen-donating compound such as water, an alcohol, or an acid.

As the organoaluminum compound, for example, an alkyl aluminum or an alkyl aluminum hydride can be used, and the organoaluminum compound is preferably an alkyl aluminum, particularly preferably a trialkyl aluminum. Specific examples of the organoaluminum compound include trimethyl aluminum, triethyl aluminum, tri-n-propyl aluminum, triisobutyl aluminum, tri-n-hexyl aluminum, and tri-n-octyl aluminum.

All of the above-described organoaluminum compounds can be used in the form of a mixture. In addition, aluminoxane obtained by a reaction between an alkyl aluminum or an alkyl aluminum hydride and water can also be used in the same manner.

In the method for producing an olefin-based resin composition according to the present invention, the molar ratio of the component (A) and the component (C), (aluminum content of component (C))/component (A), is in a range of 0.40 to 1.30, preferably in a range of 0.6 to 1.1. When the molar ratio is lower than 0.40, the component (A) in excess may interfere with the polymerization, whereas when the molar ratio is higher than 1.30, the aluminum content may remain in the resulting polymer, and this leads to poor transparency of a molded article obtained using the polymer.

In the olefin-based resin composition of the present invention, as long as the effects of the present invention are not impaired, the component (A) may be mixed with an organic solvent and then blended with the component (C), or the component (A) may be added to and blended with the component (C) and an organic solvent, that have been blended in advance. Such an organic solvent is, for example, an aliphatic or aromatic hydrocarbon compound. Examples of the aliphatic hydrocarbon compound include saturated hydrocarbon compounds, such as n-pentane, n-hexane, n-heptane, n-octane, isooctane, and refined kerosene; and cyclic saturated hydrocarbon compounds, such as cyclopentane, cyclohexane, and cycloheptane, and examples of the aromatic hydrocarbon compound include benzene, toluene, ethylbenzene, and xylene. These organic solvents may be used individually, or two or more thereof may be used in combination.

The concentration of the component (C) in the solvent is in a range of preferably 0.001 to 0.5 mol/L, particularly preferably 0.01 to 0.1 mol/L.

The method for producing an olefin-based resin composition according to the present invention includes the step of polymerizing an olefin monomer with an addition of the component (A), which has been blended with the component (C) or with the component (C) and an organic solvent, before or during the polymerization of the olefin monomer. The ratio of the olefin monomer and the component (A) may be adjusted such that the component (A) is incorporated in an amount of 0.001 to 10 parts by mass with respect to 100 parts by mass of an olefin polymer obtained by the polymerization of the olefin monomer.

As a method for adjusting the amount of the component (A) incorporated into the olefin polymer to be in the above-described range, a method in which the polymerization activity of a case where the polymerization is performed without adding the component (A) is determined and the polymerization is performed under the same conditions as in the case of not adding the component (A), but with an addition of the component (A) dissolved in the component (C) or in a combination of the component (C) and an organic solvent such that a desired amount of the component (A) is incorporated into the resulting polymer, can be employed. Alternatively, an instrument for adjusting the amounts of the respective components to be added may be introduced to a polymerization equipment, and the polymerization may be performed while making adjustments such that the component (A) is incorporated in the above-described amount.

When the component (A) is added before or during the polymerization of the olefin monomer, the component (A) may be mixed with the component (C), or the component (A) may be dispersed in an organic solvent and then dissolved with an addition of the component (C) thereto. It is believed that the component (A) is thereby masked with the component (C).

A place where the component (A) is added is not particularly restricted, and the component (A) can be added to any of the polymerization system, the catalyst system and the piping.

The polymerization of the olefin monomer can be performed in the presence of a polymerization catalyst under an inert gas atmosphere such as nitrogen, or may be performed in the above-described organic solvent. Further, an active hydrogen compound, a particulate carrier, an organoaluminum compound, an ion-exchangeable layered compound, and/or an inorganic silicate may be added within a range that does not inhibit the polymerization.

In the method for producing an olefin-based resin composition according to the present invention, the polymerization catalyst is not particularly restricted, and any known polymerization catalyst can be used. Examples thereof include compounds of transition metals belonging to Groups 3 to 11 of the periodic table (e.g., titanium, zirconium, hafnium, vanadium, iron, nickel, lead, platinum, yttrium, and samarium), and representative examples of a polymerization catalyst that can be used include Ziegler catalysts; Ziegler-Natta catalysts composed of a titanium-containing solid transition metal component and an organic metal component; metallocene catalysts composed of a transition metal compound belonging to any of Groups 4 to 6 of the periodic table, which has at least one cyclopentadienyl skeleton, and a co-catalyst component; and chrome-based catalysts.

In the method for producing an olefin-based resin composition according to the present invention, a method for polymerizing the olefin monomer is not particularly restricted, and any known method can be employed. Examples thereof include a slurry polymerization method in which polymerization is performed in an inert solvent, such as an aliphatic hydrocarbon (e.g., butane, pentane, hexane, heptane, or isooctane), an alicyclic hydrocarbon (e.g., cyclopentane, cyclohexane, or methylcyclohexane), an aromatic hydrocarbon (e.g. toluene, xylene, or ethylbenzene), a gasoline fraction, or a hydrogenated diesel fraction; a gas-phase polymerization method in which polymerization is performed in a gas phase; a bulk polymerization method in which the olefin monomer itself is used as a solvent; a solution polymerization method in which a polymer is generated in a liquid form; a polymerization method which combines these methods; a method of producing an olefin homopolymer by polymerizing the olefin monomer in a single step or multiple steps; and a polymerization method in which a copolymer is produced by copolymerizing propylene with at least one olefin (excluding propylene) unit selected from the group consisting of olefin units having 2 to 12 carbon atoms. These production methods can be employed regardless of being a batchwise type or a continuous type.

As a polymerization vessel to be used in the above-described polymerization methods, a continuous reaction vessel provided in an existing polymerization equipment can be used as is, and a conventional polymerization equipment can be used with no particular restriction in terms of its size, shape, material, and the like.

In the olefin-based resin composition of the present invention, an optional and known additive(s) (e.g., a phenolic antioxidant, a phosphorus-based antioxidant, a thioether-based antioxidant, an ultraviolet absorber, a hindered amine compound, a nucleating agent, a flame retardant, a filler, a hydrotalcite, an antistatic agent, a fluorescent brightener, a pigment, and a dye) may also be incorporated within such a range that does not markedly impair the effects of the present invention.

Further, in the method for producing an olefin-based resin composition according to the present invention, as required, a known additive(s) may be added at the time of polymerizing the olefin monomer within a range that does not adversely affect the polymerization. When such additive(s) is/are added at the time of polymerizing the olefin monomer, the additive(s) may be mixed and stirred with the component (C) in advance. In the reaction performed by this method, the additive(s) may be used as is when a compound produced as a by-product does not affect the resulting polymer; however, when the by-product compound adversely affects the polymer, it is preferred to remove this compound by vacuum distillation or the like before using the additive(s). Alternatively, the known additive(s) may be incorporated after the olefin polymerization.

Even if a direct addition of other additive(s) adversely affects the polymerization, as long as the effects on the polymerization can be suppressed by masking the additive(s) with an organoaluminum compound, such additive(s) can be used in the method of producing an olefin-based resin composition according to the present invention.

Examples of such other additives include a phenolic antioxidant, a phosphorus-based antioxidant, a thioether-based antioxidant, an ultraviolet absorber, a hindered amine compound, a nucleating agent, a flame retardant, a filler, a hydrotalcite, an antistatic agent, a fluorescent brightener, a pigment, and a dye.

Examples of the phenolic antioxidant include 2,6-di-tert-butyl-4-ethylphenol, 2-tert-butyl-4,6-dimethylphenol, styrenated phenol, 2,2'-methylene-bis(4-ethyl-6-tert-butylphenol), 2,2'-thiobis-(6-tert-butyl-4-methylphenol), 2,2'-thiodiethylene-bis[3-(3,5-di-tert-butyl-4-hydroxyphenyl)propionate], 2-methyl-4,6-bis(octylsulfanylmethyl)phenol, 2, 2'-isobutylidene-bis(4,6-dimethylphenol), isooctyl-3-(3,5-di-tert-butyl-4-hydroxyphenyl)propionate, N,N'-hexane-1, 6-diylbis[3-(3,5-di-tert-butyl-4-hydroxyphenyl)propionamide], 2,2'-oxamide-bis[ethyl-3-(3,5-di-tert-butyl-4-hydroxyphenyl)propionate], 2-ethylhexyl-3-(3',5'-di-tert-butyl-4'-hydroxyphenyl)propionate, 2,2'-ethylene-bis(4,6-di-tert-butylphenol), esters of 3,5-bis(1,1-dimethylethyl)-4-hydroxy-benzenepropanoic acid and a C13-15 alkyl, 2,5-di-tert-amyihydroquinone, hindered phenol polymers (e.g., trade name "AO.OH.98" manufactured by ADEKA Polymer Additives Europe SAS), 2,2'-methylene-bis[6-(1-methylcyclohexyl)-p-cresol], 2-tert-butyl-6-(3-tert-butyl-2-hydroxy-5-methylbenzyl)-4-methylphenyl acrylate, 2-[1-(2-hydroxy-3,5-di-tert-pentylphenyl)ethyl]-4,6-di-tert-pentylphenyl acrylate, 6-[3-(3-tert-butyl-4-hydroxy-5-methyl)propoxy]-2,4,8,10-tetra-tert-butylbenzo[d,f][1,3,2]-dio xaphosphepin, hexamethylene-bis[3-(3,5-di-tert-butyl-4-hydroxyphenyl) propionate, calcium bis[monoethyl(3,5-di-tert-butyl-4-hydroxybenzyl)phosphonate], a reaction product between 5,7-bis(1,1-dimethylethyl)-3-hydroxy-2(3H)-benzofuranone and o-xylene, 2,6-di-tert-butyl-4-(4,6-bis(octylthio)-1,3,5-triazine-2-ylamino)phenol, DL-a-tocophenol (vitamin E), 2,6-bis(α-methylbenzyl)-4-methylphenol, bis[3,3-bis-(4'-hydroxy-3'-tert-butyl-phenyl)butyric acid]glycol ester, 2,6-di-tert-butyl-p-cresol, 2,6-diphenyl-4-octadecyloxyphenol, stearyl(3,5-di-tert-butyl-4-hydroxyphenyl)propionate, distearyl(3,5-di-tert-butyl-4-hydroxybenzyl)phosphonate, tridecyl-3,5-di-tert-butyl-4-hydroxybenzyl thioacetate, thiodiethylene-bis[(3,5-di-tert-butyl-4-hydroxyphenyl)propionate], 4,4'-thiobis(6-tert-butyl-m-cresol), 2-octylthio-4,6-di (3,5-di-tert-butyl-4-hydroxyphenoxy)-s-triazine, 2,2'-methylene-bis(4-methyl-6-tert-butylphenol), bis[3,3-bis(4-hydroxy-3-tert-butylphenyl)butyric acid]glycol ester, 4,4'-butylidene-bis(2,6-di-tert-butylphenol), 4,4'-butylidene-bis(6-tert-butyl-3-methylphenol), 2,2'-ethylidene-bis(4,6-di-tert-butylphenol), 1,1,3-tris(2-methyl-4-hydroxy-5-tert-butylphenyl)butane, bis[2-tert-butyl-4-methyl-6-(2-hydroxy-3-tert-butyl-5-methylbenzyl)phenyl]terephthalate, 1,3,5-tris (2,6-dimethyl-3-hydroxy-4-tert-butylbenzyl)isocyanurate, 1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, 1,3,5-tris[(3,5-di-tert-butyl-4-hydroxyphenyl)propionyloxyethyl]isocyanurate, tetrakis[methylene-3-(3',5'-di-tert-butyl-4'-hydroxyphenyl)propionate]methane, 2-tert-butyl-4-methyl-6-(2-acryloyloxy-3-tert-butyl-5-methylbenzyl)phenol, 3,9-bis[2-(3-tert-butyl-4-hydroxy-5-methylhydrocinnamoyloxy)-1,1-dimethylethyl]-2,4,8,10-t etraoxaspiro[5.5]undecane, triethylene glycol-bis[β-(3-tert-butyl-4-hydroxy-5-methylphenyl)propionate], and 3-(3,5-dialkyl-4-hydroxyphenyl)propionic acid derivatives, such as stearyl-3-(3,5-di-tert-butyl-4-hydroxyphenyl)propionic acid amide, palmityl-3-(3,5-di-tert-butyl-4-hydroxyphenyl)propionic acid amide, myristyl-3-(3,5-di-tert-butyl-4-hydroxyphenyl) propionic acid amide and lauryl-3-(3,5-di-tert-butyl-4-hydroxyphenyl)propionic acid amide. When a phenolic antioxidant is incorporated, the amount thereof is preferably 0.001 to 5 parts by mass, more preferably 0.03 to 3 parts by mass, with respect to 100 parts by mass of the olefin-based resin.

Examples of the phosphorus-based antioxidant include triphenyl phosphite, diisooctyl phosphite, heptakis(dipropylene glycol)triphosphite, triisodecyl phosphite, diphenylisooctyl phosphite, diisooctylphenyl phosphite, diphenyltridecyl phosphite, triisooctyl phosphite, trilauryl phosphite, diphenyl phosphite, tris(dipropylene glycol)phosphite, diisodecylpentaerythritol diphosphite, dioleyl hydrogen phosphite, trilauryl trithiophosphite, bis(tridecyl)phosphite, tris (isodecyl) phosphite, tris(tridecyl)phosphite, diphenyldecyl phosphite, dinonylphenyl-bis(nonylphenyl)phosphite, poly (dipropylene glycol)phenyl phosphite, tetraphenyldipropyl glycol diphosphite, trisnonylphenyl phosphite, tris(2,4-di-tert-butylphenyl)phosphite, tris(2,4-di-tert-butyl-5-methylphenyl)phosphite, tris[2-tert-butyl-4-(3-tert-butyl-4-hydroxy-5-methylphenylthio)-5-methylphenyl]phosphite, tri (decyl) phosphite, octyldiphenyl phosphite, di(decyl) monophenyl phosphite, distearylpentaerythritol diphosphite, mixtures of distearyl pentaerythritol and calcium stearate, alkyl(C10) bisphenol-Aphosphite, di(tridecyl)pentaerythritol diphosphite, di(nonylphenyl)pentaerythritol diphosphite, bis(2,4-di-tert-butylphenyl)pentaerythritol diphosphite, bis (2,6-di-tert-butyl-4-methylphenyl)pentaerythritol diphosphite, bis(2,4,6-tri-tert-butylphenyl)pentaerythritol diphosphite, bis(2,4-dicumylphenyl)pentaerythritol diphosphite, tetraphenyl-tetra(tridecyl)pentaerythritol tetraphosphite, bis (2,4-di-tert-butyl-6-methylphenyl)ethyl phosphite, tetra(tridecyl)isopropylidene diphenol diphosphite, tetra(tridecyl)-4,4'-n-butylidene-bis(2-tert-butyl-5-methylphenol)diphosphite, hexa(tridecyl)-1,1,3-tris(2-methyl-4-hydroxy-5-tert-butylphenyl)butane triphosphite, tetrakis(2,4-di-tert-butylphenyl)biphenylene diphosphonite, 9,10-dihydro-9-oxa-10-phosphaphenanthrene-10-oxide, (1-methyl-1-propanyl-3-ylidene)-tris(1,1-dimethylethyl)-5-methyl-4,1-phenylene)hexatridecyl phosphite, 2,2'-methylene-bis(4,6-di-tert-butylphenyl)-2-ethylhexyl phosphite, 2,2'-methylene-bis(4,6-di-tert-butylphenyl)-octadecyl phosphite, 2,2'-ethylidene-bis(4,6-di-tert-butylphenyl)fluorophosphite, 4,4'-butylidene-bis(3-methyl-6-tert-butylphenylditridecyl) phosphite, tris(2-[(2,4,8,10-tetrakis-tert-butyldibenzo[d,f][1,3,2]dioxaphosphepin-6-yl)oxy]ethyl)amine, 3,9-bis(4-nonylphenoxy)-2,4,8,10-tetraoxa-3,9-diphosphaspiro[5.5] undecane, 2,4,6-tri-tert-butylphenyl-2-butyl-2-ethyl-1,3-propanediol phosphite, and poly-4,4'-isopropylidene diphenol C12-15 alcohol phosphite. When a phosphorus-based antioxidant is incorporated, the amount thereof is preferably 0.001 to 10 parts by mass, more preferably 0.01 to 0.5 parts by mass, with respect to 100 parts by mass of the olefin-based resin.

Examples of the thioether-based antioxidant include tetrakis[methylene-3-(laurylthio)propionate]methane, bis(methyl-4-[3-n-alkyl(C12/C14)thiopropionyloxy]-5-tert-butylphenyl)sulfide, ditridecyl-3,3'-thiodipropionate, dilauryl-3, 3'-thiodipropionate, dimyristyl-3,3'-thiodipropionate, distearyl-3,3'-thiodipropionate, lauryl/stearyl thiodipropionate, 4,4'-thiobis(6-tert-butyl-m-cresol), 2,2'-thiobis(6-tert-butyl-p-cresol), and distearyl disulfide. When a thioether-based antioxidant is incorporated, the amount thereof is preferably 0.001 to 10 parts by mass, more preferably 0.01 to 0.5 parts by mass, with respect to 100 parts by mass of the olefin-based resin.

Examples of the ultraviolet absorber include 2-hydroxybenzophenones, such as 2,4-dihydroxybenzophenone and 5,5'-methylene-bis(2-hydroxy-4-methoxybenzophenone); 2-(2-hydroxyphenyl)benzotriazoles, such as 2-(2-hydroxy-5-methylphenyl)benzotriazole, 2-(2-hydroxy-5-tert-octylphenyl)benzotriazole, 2-(2-hydroxy-3,5-di-tert-butylphenyl)-5-chlorobenzotriazole, 2-(2-hydroxy-3-tert-butyl-5-methylphenyl)-5-chlorobenzotriazole, 2-(2-hydroxy-3,5-dicumylphenyl)benzotriazole, 2,2'-methylene-bis(4-tert-octyl-6-benzotriazolylphenol), polyethylene glycol esters of 2-(2-hydroxy-3-tert-butyl-5-carboxyphenyl)benzotriazole, 2-[2-hydroxy-3-(2-acryloyloxyethyl)-5-methylphenyl]benzotriazole, 2-[2-hydroxy-3-(2-methacryloyloxyethyl)-5-tert-butylphenyl]benzotriazole, 2-[2-hydroxy-3-(2-methacryloyloxyethyl)-5-tert-octylphenyl]benzotriazole, 2-[2-hydroxy-3-(2-methacryloyloxyethyl)-5-tert-butylphenyl]-5-chlorobenzotriazole, 2-[2-hydroxy-5-(2-methacryloyloxyethyl)phenyl]benzotriazole, 2-[2-hydroxy-3-tert-butyl-5-(2-methacryloyloxyethyl)phenyl]benzotriazole, 2-[2-hydroxy-3-tert-amyl-5-(2-methacryloyloxyethyl)phenyl]benzotriazole, 2-[2-hydroxy-3-tert-butyl-5-(3-methacryloyloxypropyl)phenyl]-5-chlorobenzotriazole, 2-[2-hydroxy-4-(2-methacryloyloxymethyl)phenyl]benzotriazole, 2-[2-hydroxy-4-(3-methacryloyloxy-2-hydroxypropyl)phenyl]benzotriazole, and 2-[2-hydroxy-4-(3-methacryloyloxypropyl)phenyl]benzotriazole; benzoates, such as phenyl salicylate, resorcinol monobenzoate, 2,4-di-tert-butylphenyl-3,5-di-tert-butyl-4-hydroxybenzoate, octyl(3,5-di-tert-butyl-4-hydroxy)benzoate, dodecyl(3,5-di-tert-butyl-4-hydroxy)benzoate, tetradecyl(3,5-di-tert-butyl-4-hydroxy)benzoate, hexadecyl(3,5-di-tert-butyl-4-hydroxy)benzoate, octadecyl(3,5-di-tert-butyl-4-hydroxy)benzoate, and behenyl(3,5-di-tert-butyl-4-hydroxy)benzoate; substituted oxanilides, such as 2-ethyl-2'-ethoxyoxanilide and 2-ethoxy-4'-dodecyloxanilide; cyanoacrylates, such as ethyl-α-cyano-β,β-diphenylacrylate and methyl-2-cyano-3-methyl-3-(p-methoxyphenyl)acrylate; and a variety of metal salts and metal chelates, particularly salts and chelates of nickel and chromium. When an ultraviolet absorber is incorporated, the amount thereof is preferably 0.001 to 10 parts by mass, more preferably 0.01 to 0.5 parts by mass, with respect to 100 parts by mass of the olefin-based resin.

Examples of the hindered amine compound include 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl)sebacate, tetrakis(2,2,6,6-tetramethyl-4-piperidyl)-1,2,3,4-butanetetracarboxylate, tetrakis(1,2,2,6,6-pentamethyl-4-piperidyl)-1,2,3,4-butanetetracarboxylate, bis(2,2,6,6-tetramethyl-4-piperidyl)-di(tridecyl)-1,2,3,4-butanetetracarboxylate, bis(1,2,2,6,6-pentamethyl-4-piperidyl)-di(tridecyl)-1,2,3,4-butanetetracarboxylate, bis(1,2,2,4,4-pentamethyl-4-piperidyl)-2-butyl-2-(3,5-di-tert-butyl-4-hydroxybenzyl) malonate, 1-(2-hydroxyethyl)-2,2,6,6-tetramethyl-4-piperidinol/diethyl succinate polycondensate, 1,6-bis(2,2,6,6-tetramethyl-4-piperidylamino)hexane/2,4-dichloro-6-morpholino-s-triazine polycondensate, 1,6-bis(2,2,6,6-tetramethyl-4-piperidylamino)hexane/2,4-dichloro-6-tert-octylamino-s-triazin e polycondensate, 1,5,8,12-tetrakis[2,4-bis(N-butyl-N-(2,2,6,6-tetramethyl-4-piperidyl)amino)-s-triazine-6-yl]-1, 5,8,12-tetraazadodecane, 1,5,8,12-tetrakis[2,4-bis(N-butyl-N-(1,2,2,6,6-pentamethyl-4-piperidyl) amino)-s-triazine-6-yl]-1,5,8,12-tetraazadodecane, 1,6,11-tris[2,4-bis(N-butyl-N-(2,2,6,6-tetramethyl-4-piperidyl) amino)-s-triazine-6-yl]aminoun decane, 1,6,11-tris[2,4-bis(N-butyl-N-(1,2,2,6,6-pentamethyl-4-piperidyl)amino)-s-triazine-6-yl]amino undecane, bis{4-(1-octyloxy-2,2,6,6-tetramethyl)piperidyl}decanedionate, bis{4-(2,2,6,6-tetramethyl-1-undecyloxy)piperidyl)carbonate, and TINUVIN NOR 371 manufactured by BASF Ltd. When a hindered amine compound is incorporated, the amount thereof is preferably 0.001 to 10 parts by mass, more preferably 0.01 to 0.5 parts by mass, with respect to 100 parts by mass of the olefin-based resin.

Examples of the nucleating agent include metal carboxylates, such as sodium benzoate, 4-tert-butylbenzoate aluminum salt, sodium adipate, and 2-sodium-bicyclo[2.2.1]heptane-2,3-dicarboxylate; polyol derivatives, such as dibenzylidene sorbitol, bis(methylbenzylidene)sorbitol, bis(3,4-dimethylbenzylidene)sorbitol, bis(p-ethylbenzylidene) sorbitol, bis(dimethylbenzylidene)sorbitol, and 1,2,3-trideoxy-4,6:5,7-bis-O-((4-propylphenyl)methylene)nonitol; and amide compounds, such as N,N',N"-tris[2-methylcyclohexyl]-1,2,3-propane tricarboxamide, N,N',N"-tricyclohexyl-1,3,5-benzene tricarboxamide, N,N'-dicyclohexylnaphthalene dicarboxamide, and 1,3,5-tri(dimethylisopropoylamino)benzene. When a nucleating agent is incorporated, the amount thereof is preferably 0.001 to 10 parts by mass, more preferably 0.01 to 5 parts by mass, with respect to 100 parts by mass of the olefin-based resin.

Examples of the flame retardant include aromatic phosphates, such as triphenyl phosphate, tricresyl phosphate, trixylenyl phosphate, cresyldiphenyl phosphate, cresyl-2,6-dixylenyl phosphate, resorcinol-bis(diphenylphosphate), (1-methylethylidene)-4,1-phenylene tetraphenyldiphosphate, 1,3-phenylene-tetrakis(2,6-dimethylphenyl)phosphate, ADK STAB FP-500 (trade name, manufactured by ADEKA Corporation), ADK STAB FP-600 (trade name, manufactured by ADEKA Corporation), and ADK STAB FP-800 (trade name, manufactured by ADEKA Corporation); phosphonates, such as divinyl phenylphosphonate, diallyl phenylphosphonate, and (1-butenyl) phenylphosphonate; phosphinates, such as phenyl diphenylphosphinate, methyl diphenylphosphinate, and 9,10-dihydro-9-oxa-10-phosphaphenanthlene-10-oxide derivatives; phosphazene compounds, such as bis(2-allylphenoxy)phosphazene and dicresylphosphazene; phosphorus-based flame retardants, such as melamine phosphate, melamine pyrophosphate, melamine polyphosphate, melam polyphosphate, ammonium polyphosphate, piperazine phosphate, piperazine pyrophosphate, piperazine polyphosphate, phosphorus-containing vinylbenzyl compounds, and red phosphorus; metal hydroxides, such as magnesium hydroxide and aluminum hydroxide; and bromine-based flame retardants, such as brominated bisphenol A-type epoxy resins, brominated phenol novolac-type epoxy resins, hexabromobenzene, pentabromotoluene, ethylene-bis(pentabromophenyl), ethylene-bis-tetrabromophthalimide, 1,2-dibromo-4-(1,2-dibromoethyl)cyclohexane, tetrabromocyclooctane, hexabromocyclododecane, bis(tribromophenoxy)ethane, brominated polyphenylene ether, brominated polystyrene, 2,4,6-tris(tribromophenoxy)-1,3,5-triazine, tribromophenyl maleimide, tribromophenyl acrylate, tribromophenyl methacrylate, tetrabromobisphenol A-type dimethacrylate, pentabromobenzyl acrylate, and brominated styrene. These flame retardants are preferably used in combination with a drip inhibitor such as a fluorocarbon resin, and/or a flame retardant aid such as a polyhydric alcohol or hydrotalcite. When a flame retardant is incorporated, the amount thereof is preferably 1 to 100 parts by mass, more preferably 10 to 70 parts by mass, with respect to 100 parts by mass of the olefin-based resin.

Examples of the filler include talc, mica, calcium carbonate, calcium oxide, calcium hydroxide, magnesium carbonate, magnesium hydroxide, magnesium oxide, magnesium sulfate, aluminum hydroxide, barium sulfate, glass powder, glass fibers, clays, dolomite, mica, silica, alumina, potassium titanate whiskers, wollastonite, and fibrous magnesium oxysulfate, and any of these fillers can be used by appropriately selecting the particle size (the fiber diameter, fiber length and aspect ratio in the case of a fibrous filler). Further, the filler to be used may be subjected to a surface treatment as required. When a filler is incorporated, the amount thereof is preferably 0.01 to 80 parts by mass, more preferably 1 to 50 parts by mass, with respect to 100 parts by mass of the olefin-based resin.

The above-described hydrotalcite is a complex salt compound which is known as a natural or synthetic product and composed of magnesium, aluminum, hydroxy groups, a carbonate group and arbitrary crystal water, and examples thereof include hydrotalcites in which some of the magnesium or aluminum atoms are substituted with other metal such as an alkali metal or zinc; and hydrotalcites in which the hydroxy group(s) and/or carbonate group is/are substituted with other anionic group(s), specifically hydrotalcites represented by Formula (3) below in which a metal is substituted with an alkali metal. In addition, as an Al—Li hydrotalcite, a compound represented by Formula (4) below can be used as well.

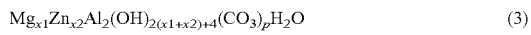

$$Mg_{x1}Zn_{x2}Al_2(OH)_{2(x1+x2)+4}(CO_3)_p H_2O \quad (3)$$

wherein x1 and x2 each represent a number that satisfies the conditions represented by the following equations, and p represents 0 or a positive number: $0 \leq x2/x1 < 10$, and $2 \leq (x1+x2) \leq 20$.

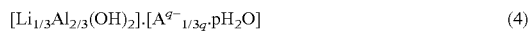

$$[Li_{1/3}Al_{2/3}(OH)_2] \cdot [A^{q-}{}_{1/3q} \cdot pH_2O] \quad (4)$$

wherein $A^{q-}$ represents an anion having a valence of q; and p represents 0 or a positive number.

Further, the carbonate anions in these hydrotalcites may be partially substituted with other anions.

In these hydrotalcites, the crystal water may be dehydrated, and the hydrotalcites may be coated with, for example, a higher fatty acid such as stearic acid, a higher fatty acid metal salt such as alkali metal oleate, a metal organic sulfonate such as alkali metal dodecylbenzenesulfonate, a higher fatty acid amide, a higher fatty acid ester, or a wax.

The hydrotalcite may be a naturally-occurring or synthetic hydrotalcite. Examples of a synthesis method thereof include known methods that are described in JPS46-2280B1, JPS50-30039B1, JPS51-29129B1, JPH03-36839B2, JPS61-174270A, JPH05-179052A, and the like. Further, the above-exemplified hydrotalcites can be used without any restriction in terms of their crystal structures, crystal particles and the like. When a hydrotalcite is incorporated, the amount thereof is preferably 0.001 to 5 parts by mass, more preferably 0.05 to 3 parts by mass, with respect to 100 parts by mass of the olefin-based resin.

A lubricant is added for the purposes of imparting the surface of the resulting molded article with lubricity and improving the damage-preventing effect. Examples of the lubricant include unsaturated fatty acid amides, such as oleic acid amide and erucic acid amide; saturated fatty acid amides, such as behenic acid amide and stearic acid amide; butyl stearate; stearyl alcohol; stearic acid monoglyceride; sorbitan monopalmitate; sorbitan monostearate; mannitol; stearic acid; hardened castor oil; stearic acid amide; oleic acid amide; and ethylene-bis stearic acid amide. These lubricants may be used individually, or two or more thereof may be used in combination. When a lubricant is incorporated, the amount thereof is preferably 0.01 to 2 parts by mass, more preferably 0.03 to 0.5 parts by mass, with respect to 100 parts by mass of the olefin-based resin.

Examples of the antistatic agent include cationic antistatic agents, such as fatty acid quaternary ammonium ion salts and polyamine quaternary salts; anionic antistatic agents, such as higher alcohol phosphates, higher alcohol EO adducts, polyethylene glycol fatty acid esters, anionic alkyl sulfonates, higher alcohol sulfates, higher alcohol ethylene oxide adduct sulfates, and higher alcohol ethylene oxide adduct phosphates; nonionic antistatic agents, such as polyhydric alcohol fatty acid esters, polyglycol phosphates, and polyoxyethylene alkyl allyl ethers; and amphoteric antistatic agents, such as amphoteric alkyl betaines (e.g., alkyldimethylamino acetic acid betaines) and imidazoline-type amphoteric activators. These antistatic agents may be used individually, or two or more thereof may be used in combination. When an antistatic agent is incorporated, the amount thereof is preferably 0.01 to 20 parts by mass, more preferably 3 to 10 parts by mass, with respect to 100 parts by mass of the olefin-based resin.

The fluorescent brightener is a compound which enhances the whiteness or blueness of a molded article by a fluorescent action of absorbing ultraviolet rays of solar light and artificial light, converting the absorbed ultraviolet rays into visible light of purple to blue and radiating the visible light. Examples of the fluorescent brightener include C.I. Fluorescent Brightener 184, which is a benzoxazole-based compound; C.I. Fluorescent Brightener 52, which is a coumarin-based compound; and C.I. Fluorescent Brighteners 24, 85 and 71, which are diaminostyrylbenzyl sulfone-based compounds. When a fluorescent brightener is used, the amount thereof is preferably 0.00001 to 0.1 parts by mass, more preferably 0.00005 to 0.05 parts by mass, with respect to 100 parts by mass of the olefin-based resin.

As the above-described pigment, a commercially available pigment can be used as well, and examples thereof include PIGMENT RED 1, 2, 3, 9, 10, 17, 22, 23, 31, 38, 41, 48, 49, 88, 90, 97, 112, 119, 122, 123, 144, 149, 166, 168, 169, 170, 171, 177, 179, 180, 184, 185, 192, 200, 202, 209, 215, 216, 217, 220, 223, 224, 226, 227, 228, 240, and 254; PIGMENT ORANGE 13, 31, 34, 36, 38, 43, 46, 48, 49, 51, 52, 55, 59, 60, 61, 62, 64, 65, and 71; PIGMENT YELLOW 1, 3, 12, 13, 14, 16, 17, 20, 24, 55, 60, 73, 81, 83, 86, 93, 95, 97, 98, 100, 109, 110, 113, 114, 117, 120, 125, 126, 127, 129, 137, 138, 139, 147, 148, 150, 151, 152, 153, 154, 166, 168, 175, 180, and 185; PIGMENT GREEN 7, 10, and 36; PIGMENT BLUE 15, 15:1, 15:2, 15:3, 15:4, 15:5, 15:6, 22, 24, 29, 56, 60, 61, 62, and 64; and PIGMENT VIOLET 1, 15, 19, 23, 27, 29, 30, 32, 37, 40, and 50.

Examples of the above-described dye include azo dyes, anthraquinone dyes, indigoid dyes, triarylmethane dyes, xanthene dyes, alizarin dyes, acridine dyes, stilbene dyes, thiazole dyes, naphthol dyes, quinoline dyes, nitro dyes, indamine dyes, oxazine dyes, phthalocyanine dyes and cyanine dyes, and a plurality of these dyes may be mixed and used in combination.

As a method for incorporating other additives into the olefin polymer, the olefin polymer and other additives can be blended and then melt-kneaded using a kneader, a roll mill, a uniaxial extruder, a biaxial extruder, a multiaxial extruder or the like; and from the operativity standpoint, it is preferred to use a uniaxial extruder or a biaxial extruder. When a biaxial extruder is used, it can be used regardless of whether the rotation directions of its screws are the same or different. Further, for improvement of the product quality and the working environment, it is preferred to perform purging with an inert gas and/or degassing via single-stage and multi-stage vents.

The molded article of the present invention is obtained by molding the olefin-based resin composition of the present invention. The olefin-based resin composition obtained by the method of producing an olefin-based resin according to the present invention can be molded by any known olefin-based resin molding method to obtain a molded article. The known molding method may be any of extrusion molding, injection molding, vacuum molding, blow molding and compression molding, and molded articles, for example, food containers; cosmetic and medical containers; bottles, such as food bottles, beverage bottles, cooking oil bottles, and seasoning bottles; packaging materials, such as food packaging materials, wrapping materials, and transport packaging materials; sheets and films; fibers; miscellaneous daily goods; toys; automobile materials; and home electric appliance materials, can be thereby easily obtained. Further, glass fibers, carbon fibers or the like may be incorporated to produce fiber-reinforced plastics.

EXAMPLES

The present invention will now be described more concretely by way of Production Examples, Examples and Comparative Examples; however, the present invention is not restricted thereto by any means.
(Preparation of Component (A) Solution)
In a flask placed in a glove box under a nitrogen atmosphere, 6.9 g of Compound 1 (hydroxy-2,2'-methylene-bis(4,6-di-tert-butylphenyl)phosphate), 331.0 mL of hexane and 14.2 mL of a 1 mol/L heptane solution of triethyl aluminum were added and mixed with stirring to prepare a homogeneous solution of the component (A) that had a Compound 1 with concentration of 20 mg/mL.
(Preparation of Component (A)-2 Solution)
In a flask placed in a glove box under a nitrogen atmosphere, 6.9 g of Compound 1 (hydroxy-2,2'-methylene-bis(4,6-di-tert-butylphenyl)phosphate), 326.8 mL of hexane and 18.4 mL of a 1 mol/L heptane solution of triethyl aluminum were added and mixed with stirring to prepare a homogeneous solution of the component (A)-2 that had a Compound 1 with concentration of 20 mg/mL.
(Polymerization)

Examples 1 to 4

To a 17 L pressure-resistant reaction vessel purged with nitrogen, 10 mL of a 1 mol/L heptane solution of triethyl aluminum, 1.0 mL of a 1 mol/L heptane solution of cyclohexyldimethoxysilane, 3.3 g of a 5% by mass oil slurry of Ziegler catalyst, and the above-prepared component (A) solution were added such that the component (A) was incorporated in the respective amounts shown in Table 1 with respect to 100 parts by mass of the resulting polymer. A pressure of 0.14 MPaG was applied with hydrogen and a pressure of 3.7 MPaG was further applied with propylene, and stirring was initiated to perform prepolymerization for 3 minutes at 25° C. Subsequently, the temperature was raised to 70° C. to perform a polymerization reaction for 1 hour at 70° C. The polymerization reaction was quenched with an addition of 50 mL of ethanol, after which the solvent was transferred to a flare line under a nitrogen atmosphere and thereby removed. Thereafter, the polymerization product was dried in vacuum at 40° C. to obtain a polymer. The thus obtained polymer had a polymerization activity of 26.0 kg per 1 g of the catalyst.

Comparative Examples 1 to 3

To a 17 L pressure-resistant reaction vessel purged with nitrogen, 10 L of heptane, 38 mL of a 1-mol/L heptane solution of triethyl aluminum, 3.8 mL of a 1-mol/L heptane solution of cyclohexyldimethoxysilane, 6.8 g of a 5% by mass oil slurry of Ziegler catalyst, and the above-prepared component (A) solution were added such that the component (A) was incorporated in the respective amounts shown in Table 1 with respect to 100 parts by mass of the resulting polymer, followed by stirring for about 2 minutes. A pressure of 0.06 MPaG was applied with hydrogen and a pressure of 0.1 MPaG was further applied with propylene, and prepolymerization was performed for 3 minutes at 25° C. Subsequently, the temperature was raised to 70° C. and a pressure of 0.6 MPaG was applied with propylene to perform a polymerization reaction for 1 hour at 70° C. The polymerization reaction was quenched with an addition of 50 mL of ethanol, after which the solvent was transferred to a flare line under a nitrogen atmosphere and thereby removed. Thereafter, the polymerization product was dried in vacuum at 40° C. to obtain a polymer. The thus obtained polymer had a polymerization activity of 8.0 kg per 1 g of the catalyst.

Comparative Example 4

A polymer was obtained in the same manner as in Comparative Example 1, except that the component (A) solution was changed to the component (A)-2 solution. The thus obtained polymer had a polymerization activity of 8.0 kg per 1 g of the catalyst.

TABLE 1

| | Component (A) | Amount [parts by mass] | Polymerization activity [kg/g catalyst] | Residual Al content [mol/kg resin] |
|---|---|---|---|---|
| Example 1 | Compound 1 | 0.02 | 26.0 | 0.0028 |
| Example 2 | Compound 1 | 0.2 | 26.0 | 0.0065 |
| Example 3 | Compound 1 | 0.2 | 26.0 | 0.0065 |
| Example 4 | Compound 1 | 0.2 | 26.0 | 0.0081 |
| Comparative Example 1 | Compound 1 | 0.02 | 8.0 | 0.014 |
| Comparative Example 2 | Compound 1 | 0.2 | 8.0 | 0.018 |
| Comparative Example 3 | Compound 1 | 0.2 | 8.0 | 0.018 |
| Comparative Example 4 | Compound 1 | 0.2 | 8.0 | 0.019 |

Compound 1: hydroxy-2,2'-methylene-bis(4,6-di-tert-butylphenyl)phosphate (Aluminum Content)
For each of the polymer powders obtained by the above-described polymerization reaction, the aluminum content in each polymer was measured using an ICP emission spectrophotometer SPS3500 (manufactured by SII NanoTechnology Inc.). The results thereof are shown in Table 1.
(Evaluation of Transparency)
The additives shown in Table 2 were added and mixed with 100 parts by mass of each of the thus obtained polymers, and the resulting mixture was melt-kneaded using a biaxial extruder (apparatus: TEX28V manufactured by The Japan Steel Works, Ltd., extrusion temperature: 230° C., screw rotation speed: 150 rpm) to obtain a strand, which was subsequently pelletized. The thus obtained pellets were injection-molded using an injection molding machine (apparatus: EC-220 manufactured by Toshiba Machine Co., Ltd.) at an injection temperature of 230° C. and a mold temperature of 40° C. to prepare a 60 mm×60 mm×1 mm plate-form test piece. The thus obtained plate-form test piece was left to stand in a 23° C. incubator for at least 48 hours, after which the haze of the test piece was measured using Haze Guard II (manufactured by Toyo Seiki Seisaku-sho, Ltd.). The results thereof are shown in Table 1.

(Evaluation of Color Tone)

The additives shown in Table 2 were added and mixed with 100 parts by mass of each of the thus obtained polymers, and the resulting mixture was melt-kneaded using a biaxial extruder (apparatus: TEX28V manufactured by The Japan Steel Works, Ltd., extrusion temperature: 230° C., screw rotation speed: 150 rpm) to obtain a strand, which was subsequently pelletized. The thus obtained pellets were injection-molded using an injection molding machine (apparatus: EC-220 manufactured by Toshiba Machine Co., Ltd.) at an injection temperature of 230° C. and a mold temperature of 40° C. to prepare a 60 mm×60 mm×1 mm plate-form test piece. The thus obtained plate-form test piece was left to stand in a 23° C. incubator for at least 48 hours, after which the YI of the test piece was measured using an integrating sphere spectrophotometer CE-7000A (manufactured by X-Rite Inc.). The results thereof are shown in Table 2.

TABLE 2

| | Additive added during polymerization (first step) | | Additives added at the time of granulation (second step) | | Residual Al content [mol/kg resin] | Haze [%] | YI |
|---|---|---|---|---|---|---|---|
| | Compound | Amount [parts by mass] | Compounds | Amount [parts by mass] | | | |
| Example 1 | Compound 1 | 0.02 | AO-1 | 0.05 | 0.0028 | 35.2 | 5.5 |
| | | | AO-2 | 0.10 | | | |
| | | | Na-St | 0.06 | | | |
| Example 2 | Compound 1 | 0.2 | AO-1 | 0.05 | 0.0065 | 23.8 | 5.6 |
| | | | AO-2 | 0.10 | | | |
| | | | Na-St | 0.17 | | | |
| Example 3 | Compound 1 | 0.2 | AO-1 | 0.05 | 0.0065 | 16.7 | 6.0 |
| | | | AO-2 | 0.10 | | | |
| | | | Li-My | 0.17 | | | |
| Example 4 | Compound 1 | 0.2 | AO-1 | 0.05 | 0.0081 | 24.0 | 5.9 |
| | | | AO-2 | 0.10 | | | |
| | | | Na-St | 0.17 | | | |
| Comparative Example 1 | Compound 1 | 0.02 | AO-1 | 0.05 | 0.014 | 52.6 | 8.2 |
| | | | AO-2 | 0.10 | | | |
| | | | Na-St | 0.06 | | | |
| Comparative Example 2 | Compound 1 | 0.2 | AO-1 | 0.05 | 0.018 | 34.9 | 7.7 |
| | | | AO-2 | 0.10 | | | |
| | | | Na-St | 0.17 | | | |
| Comparative Example 3 | Compound 1 | 0.2 | AO-1 | 0.05 | 0.018 | 30.4 | 8.1 |
| | | | AO-2 | 0.10 | | | |
| | | | Li-My | 0.17 | | | |
| Comparative Example 4 | Compound 1 | 0.2 | AO-1 | 0.05 | 0.019 | 34.8 | 8.0 |
| | | | AO-2 | 0.10 | | | |
| | | | Na-St | 0.17 | | | |

Compound 1: hydroxy-2,2'-methylene-bis(4,6-di-tert-butylphenyl)phosphate
AO-1: tetrakis[methylene-3-(3'5'-di-tert-butyl-4'-hydroxyphenyl)propionate]methane
AO-2: tris(2,4-di-tert-butylphenyl)phosphite
Na-St: sodium stearate
Li-My: lithium myristate According to Comparative Examples 1 to 4, in those cases where an olefin-based resin composition having an aluminum content of more than 0.01 mol per 1 kg of olefin polymer was molded, the resulting test piece exhibited major coloration and its transparency was not satisfactory. On the other hand, it was confirmed that, in the molded articles obtained using the olefin-based resin composition of the present invention, coloration was inhibited and favorable transparency was attained.

The invention claimed is:
1. A method for producing an olefin-based resin composition, the method comprising:
a first step of adding one or more compounds (A) represented by Formula (1) and an organoaluminum compound (C), which are blended at a molar ratio [(aluminum content of organoaluminum compound (C))/ compound (A)] in a range of 0.40 to 1.30, before or during polymerization of an olefin monomer:

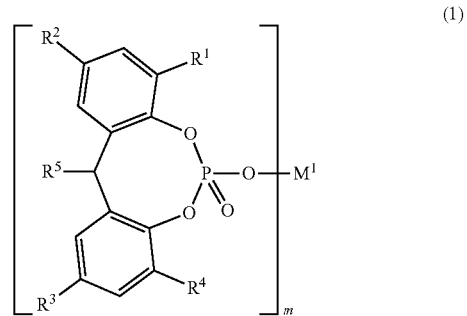

wherein $R^1$ to $R^4$ each independently represent a hydrogen atom or an alkyl group having 1 to 9 carbon atoms; $R^5$ represents a hydrogen atom or methyl; m represents 1 or 2; and $M^1$ represents a hydrogen atom, an alkali metal atom, an alkaline earth metal atom, a transition metal atom, a base metal atom, a multivalent metal inorganic group, an ammonium group, a sulfonium group, or a lanthanoid; and a second step of adding 0.001 to 10 parts by mass of a fatty acid metal salt (B) represented by the fatty acid metal salt (B) represented by the following Formula (2) with respect to 100 parts by mass of a polymer obtained by the polymerization of the olefin monomer, and melt-kneading the resultant using an extruder:

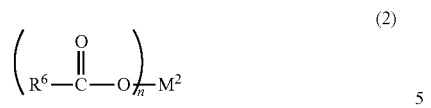

wherein R⁶ represents a group having 10 to 30 carbon atoms and introduced from an aliphatic organic acid; and $M^2$ represents an alkali metal atom or a multivalent metal inorganic group, wherein an aluminum content in the resulting olefin polymer is 0.01 mol or less per 1 kg of the olefin polymer.

2. The method for producing an olefin-based resin composition according to claim 1, wherein the polymerization of the olefin monomer is performed by bulk polymerization.

3. The method for producing an olefin-based resin composition according to claim 1, wherein the organoaluminum compound (C) is a trialkyl aluminum.

4. The method for producing an olefin-based resin composition according to claim 2, wherein the organoaluminum compound (C) is a trialkyl aluminum.

* * * * *